US007486636B2

(12) United States Patent  
Francalanci et al.

(10) Patent No.: US 7,486,636 B2
(45) Date of Patent: Feb. 3, 2009

(54) METHOD, SYSTEM AND COMPUTER PROGRAM FOR PLANNING A TELECOMMUNICATIONS NETWORK

(75) Inventors: Indro Francalanci, Turin (IT); Massimiliano Panico, Turin (IT)

(73) Assignee: Telecom Italia S.p.A., Milan (IT)

( * ) Notice: Subject to any disclaimer, the term of this patent is extended or adjusted under 35 U.S.C. 154(b) by 406 days.

(21) Appl. No.: 10/583,769
(22) PCT Filed: Dec. 22, 2003
(86) PCT No.: PCT/IT03/00850

§ 371 (c)(1),
(2), (4) Date: Jun. 21, 2006

(87) PCT Pub. No.: WO2005/062647

PCT Pub. Date: Jul. 7, 2005

(65) Prior Publication Data

US 2007/0123264 A1    May 31, 2007

(51) Int. Cl.
H04Q 7/00  (2006.01)
H04Q 7/24  (2006.01)
H04Q 7/20  (2006.01)
H04L 12/16 (2006.01)

(52) U.S. Cl. .................. 370/328; 370/338; 370/352; 370/259; 455/466; 455/522; 455/422.1

(58) Field of Classification Search .......... 455/466, 455/522, 422.1, 403, 414.3, 457, 63.1, 446, 455/432.3, 433; 370/338, 328, 259, 238, 370/352; 345/63

See application file for complete search history.

(56) References Cited

U.S. PATENT DOCUMENTS 6,111,857 A    8/2000  Soliman et al.

(Continued)

FOREIGN PATENT DOCUMENTS

EP    0 986 276 A2    3/2000

(Continued)

OTHER PUBLICATIONS

Wacker et al., "MATLAB Implementation of a Static Radio Network Planning Tool for Wideband CDMA"; Radio Network Planning and Optimisation for Limits, Laiho et al., ed; Wiley & Sons, pp. xii, 98, 119, (2002).

(Continued)

*Primary Examiner*—Charles N Appiah
*Assistant Examiner*—Kiet Doan
(74) *Attorney, Agent, or Firm*—Finnegan, Henderson, Farabow, Garrett & Dunner, L.L.P.

(57) ABSTRACT

Method for planning a telecommunications network for radio equipment including a plurality of cells distributed on a geographic area, each one of which has a set of elementary territory areas (pixels) adapted to receive a radio signal radiated by a respective fixed radio base station, wherein radio equipment located in a cell is subjected to receive signals from common pilot channels broadcast by a plurality of radio base stations. The method includes, for each cell, the estimation of the interference level provided by nearby cells to the traffic offered to pixels of the cell related to the power difference between pilot channels broadcast by the base station of the cell and pilot channels broadcast by base stations of nearby cells. Such estimation is obtained depending on the amount of traffic expected in the examined pixels.

15 Claims, 4 Drawing Sheets

U.S. PATENT DOCUMENTS

2003/0148782 A1  8/2003  Gustafsson
2005/0057452 A1* 3/2005  Suzuki et al. ................. 345/63

FOREIGN PATENT DOCUMENTS

EP        1 292 162 A1    3/2003

WO        WO-02/35872 A1   5/2002

OTHER PUBLICATIONS

"3RD Generation Partnership Project; Technical Specification Group Radio Access Networks; Radio Frequency (RF) System Scenarios (Release 6)"; 3GPP TR 25.942 V6.0.0, pp. 1-121, (2002).

* cited by examiner

METHOD, SYSTEM AND COMPUTER PROGRAM FOR PLANNING A TELECOMMUNICATIONS NETWORK

CROSS REFERENCE TO RELATED APPLICATION

This application is a national phase application based on PCT/IT2003/000850, filed Dec. 22, 2003, the content of which is incorporated herein by reference.

FIELD OF THE INVENTION

The present invention deals in general with planning of a telecommunications network for radio equipment, and more specifically deals with a method, a system and a computer program product for planning a telecommunications network for radio equipment including a plurality of cells arranged in a geographic area.

In particular, the present invention deals with a method for planning a telecommunications network paying attention to limiting the pilot pollution phenomenon, in addition to a processing system or group of programs for performing the above method.

BACKGROUND OF THE INVENTION

Telecommunication networks, particularly for radio-mobile equipment of the cellular type, are characterized by the division of the network covering geographic area into a plurality of cells, each one of which is defined as the set of elementary territory areas (pixels) served by the radio-electric signal radiated by the antenna of a fixed radio base station.

Telecommunication networks for third-generation UMTS (Universal Mobile Telecommunications System) radio-mobile terminals use, as known, a radio interface based on the CDMA (Code Division Multiple Access) technique.

Among the known cellular networks, those that use a CDMA access technique show the peculiarity that the same frequency band (channel) can be used in different cells, so that the passage of a mobile terminal from one cell to another neighbor cell (handover) can be managed by using the same frequency. Such technique are called "soft handover".

The "soft handover" mechanism provides that, in particular areas, called soft handover or macro-diversity areas, a mobile terminal is able to decode the signals from many antennas, and therefore to exchange information with many Radio Base Stations (RBS).

The location of macro-diversity areas and their dimensioning are highly important for the correct operation and cell equipment dimensioning in a telecommunications network since, as obvious, a mobile terminal in macro-diversity engages resources from all Radio Base Stations with which it is simultaneously connected.

A further peculiarity of UTMS networks consists in that such networks are adapted to provide a plurality of services, such as for example:

Telephone;
Fax;
Video-telephone;
Internet access, and that each one of such services generally has service-specific characteristics in terms of speed (number of bits per second) and traffic (amount, symmetrical or asymmetrical).

It follows that, when planning a network, cell sizing must jointly take into account the characteristics of each service and the possible grouping of services on a single radio carrier, as provided in agreement with the CDMA access technique.

Therefore, planning of UMTS networks, due to its peculiarity, is a complex activity that requires substantially different approaches from those so far used for known mobile networks such as GSM (Global System for Mobile Communication) or IS95 (Interim Standard).

The known methods for simulating UMTS networks can be grouped, according to their approach, into two different families: "statistic" methods and "deterministic" methods.

Statistic methods are mainly based on a Montecarlo type approach (refer to 3GPP TR 25.942 v6.0.0 2002-12—"RF System Scenarios—Release 6").

The term "Montecarlo simulation" is usually employed for pointing out a static simulation composed of a series of statistically independent "snapshots". After having fixed the scenario object of the study, each snapshot consists in a realization of a stochastic process generated starting from different distributions of users in the examined area, that simulates the behavior of the examined network. At the end of every snapshot network performance indicators are provided as results. The simulation ends with the statistical analysis of various performance indicators provided by the snapshots, for which their number must be enough to guarantee statistic stability of results that will determine such planning.

It is a rather specific methodology that is particularly adapted to examine performances of a network, for example of the UTMS type, that is scarcely geographically extended, but that, due to an intrinsic model "slowness" due to the statistic convergence of results, cannot be extended to the treatment of networks of such type related to geographic areas that can be compared with those of a nation such as Italy, for example.

Deterministic methods, though keeping the static analysis characteristic, systematically take into account all territory pixels on which the network insists, and clearly are more adapted for planning networks, for example of the UTMS type, related to very wide geographic areas, even if the result generally has smaller levels of compliance with the evolving reality. Different from Montecarlo methods, they have as input a single distribution of users and are carried out in a single simulation without the need of statistic aggregations of results.

Depending on a series of simulations using one of the previously mentioned methods, it is possible to realize a planning process that results in a set of network configuration parameters to be adopted to reach performances that the network must guarantee for the provided users.

Among the objectives in terms of performances of a planning process performed using any simulation method, being a statistic or deterministic one, the "pilot pollution" phenomenon limitation becomes important.

Like every cellular radio-mobile system, the UTMS system too provides for common control channels that are spread within the whole area of each cell. Such channels transmit system information that are mandatory for receiving terminals.

Among these, the CPICH (Common PIlot CHannel) pilot channel is a physical channel in downlink that transmits a predefined sequence of bits at 30 kbit/s and is used by mobile terminals for synchronizing to the network. The pilot channel signal acts as "beacon" to point out the existence of a nearby base station to network receiving terminals.

Each cell transmits its own pilot signal at a common frequency, and with a power that is a fraction of the maximum power that can be radiated by the cell. The comparison between signal powers of different pilot channels allows the terminals to recognize the server base station and to manage possible hand-over processes.

If a terminal is in an area in which it receives the pilot signals of a greater number of cells than the number of cells that can be managed by the terminal and with comparable powers, there results an interference phenomenon known as "pilot pollution" that can create a decreased transmission capability in the area or even the loss of current calls. This phenomenon also implies higher consumption of internal terminal power due to the increase of processing needs. In fact, in such situation, the mobile terminal continuously changes the set of cells to which it is connected in macro-diversity (so-called "active set"), since the number of candidate cells to macro-diversity is greater than the maximum number of cells that can be managed by the terminal itself.

The pilot pollution therefore is an indicator of how many cells in excess are perceived by a radio-mobile terminal when it is connected to a network (and therefore of how many cells in excess would be perceived by a radio-mobile terminal once connected to the network being planned) with respect to its capability of managing cells (maximum number of cells to which it can be connected in macro-diversity) and with respect to parameters being set in the network.

For such purposes, systems and methods are known in the art for planning UMTS networks that take into account the pilot pollution phenomenon, for example the 3g Tool by Aircom International based on a Montecarlo method, and the NPSW (Network Planning. Strategies for WCDMA) Tool by Nokia (see manual: "Radio Network Planning Optimization for UMTS", Joana et al., Wiley&Sons, 2002) based on a deterministic method.

The Applicant has detected that, from part of the known art, the pilot pollution evaluation is performed based on information related to electromagnetic coverages and parameters set in the network, such as, for example, the macro-diversity depth (in dBm) and the maximum number of cells to which the terminal can be connected in macro-diversity ("active set"). The Applicant has further observed that planning of a network configuration that limits the pilot pollution phenomenon based only on the knowledge of the electromagnetic coverages of the cells does not optimize the use of network resources, since network resources are paid also in areas where they would not be necessary, namely in non-critical areas as regards the service offer profile, where the number of users that access the network is rather small.

SUMMARY OF THE INVENTION

Object of the present invention is realizing a method and a system for planning a telecommunications network for radio equipment that do without the limits described in the prior art and that selectively optimize the network configuration depending on the probability of pilot pollution occurrence in critical areas, namely with a high probability of generating traffic.

According to the present invention, such object is reached with a method and a system for planning a telecommunications network whose characteristics can be found in the independent Claims.

A further object of the present invention is a processing program or group of programs as claimed.

Synthetically, the present invention is based on the assumption that performances of a network also depend on the density of user activation, namely on the time characteristics of network activities (variable traffic).

In other terms, if a pixel has a very low offered traffic, it is not convenient that the pilot pollution phenomenon is taken into account by the relevant telephone operator, since the phenomenon negatively affects a limited number of users.

Vice versa, if the same pixel is characterized by a high value of offered traffic with the consequence that mobile terminals must increase their processing power since they receive from the server base station a pilot signal whose power is comparable with that of the pilot channels of adjacent cells, under such situation it is convenient that the pilot pollution phenomenon is taken into account by the telephone operator since this phenomenon negatively affects a high number of users.

It results that minimizing the pilot pollution phenomenon is particularly important in territory areas where the probability of generating traffic is high (for example: urban centers, motorways), while it is not a meaningful problem in areas with scarce probability of generating traffic (for example: inhabited areas, woods).

The present invention therefore is based on the principle of evaluating the pilot pollution phenomenon depending on the amount of expected traffic in the territory area under planning, namely the probability of service request from single pixels.

The innovative criteria of estimating the pilot pollution can be used—in a planning process of a cellular telecommunication network—when evaluating the cell domain or the service areas, as will be more clear from the following detailed description.

DETAILED DESCRIPTION OF THE FIGURES

Further advantages and characteristics of the present invention will appear from the following detailed description, provided as a non-limiting example with reference to the enclosed drawings, in which.

DETAILED DESCRIPTION OF THE INVENTION

Figure 1:
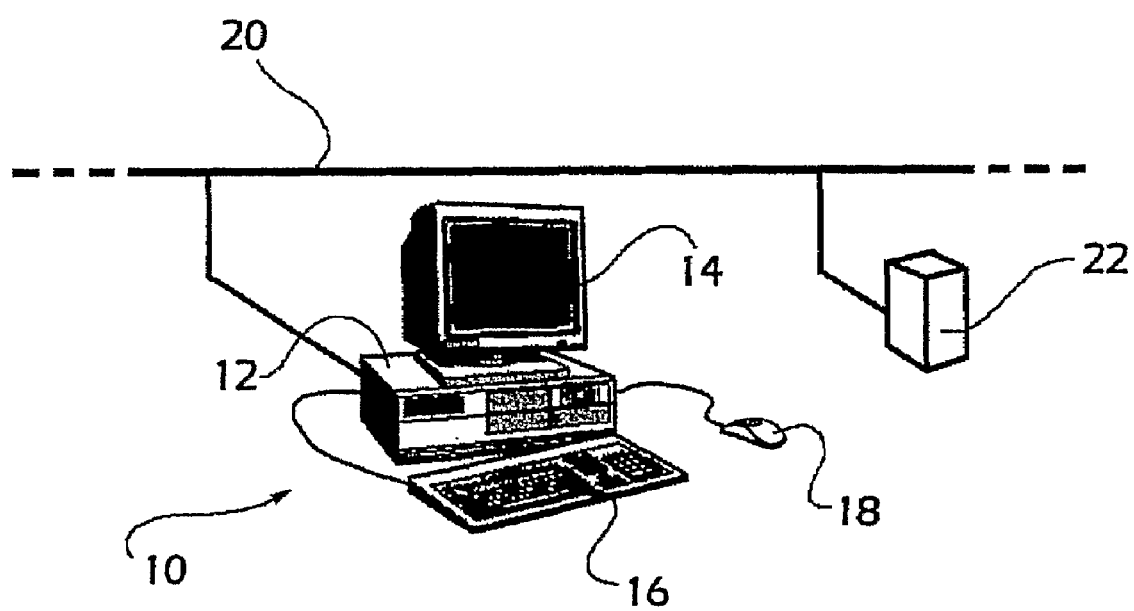
FIG. 1 is a simplified diagram of a system for planning a telecommunications network for radio equipment according to the invention.

With reference to FIG. 1, a system is essentially shown for planning a telecommunications network for radio equipment or terminals (for example radio-mobile, or more simply mobile, terminals). It comprises, for example, a computerized workstation 10, of a known type, having a processing subsystem (basic module) 12, a displaying device (display) 14, a keyboard 16, a pointing device (mouse) 18 and a device for connection to a local network (network bus) 20.

As workstation 10, for example the J6700 model from Hewlett-Packard Company can be used, having a 750-MHz CPU, a 10-Gbyte RAM memory, a 70-Gbyte internal disk drive and a UNIT-type operating system.

The workstation is arranged to process groups or modules of programs stored on a disk or accessible in the network, and to display results on the display 14. Groups or modules of programs are processing and computation programs that realize a method for planning a telecommunications network, for example a deterministic method known in its general terms from WO-A-02/35872.

The system according to the invention further comprises a subsystem of disks 22, of a known type, connected by means of the network connection 20 to the workstation 10 and adapted to contain reference data bases stored therein, as will be described in detail hereinafter, with reference to implementing the method according to the invention.

Obviously, the data bases can also be stored, if of limited sizes, in the disk unit of workstation 10 without thereby changing the characteristics of the invention. Moreover, the system can be arranged for the connection to other input/output, local or remote peripheral devices, or can consist in a processing system of the distributed type, but such herein described arrangements are deemed well known in the art and will not be further described herein, since they are not relevant in order to carry out and understand the present invention.

In general, the system in the described configuration or in other equivalent configurations is arranged for planning and dimensioning a telecommunications network for radio terminals depending on programs or groups of programs (modules) implemented for carrying out the method according to the invention and with the help of data bases stored in the subsystem of disks 22.

Figure 2A:
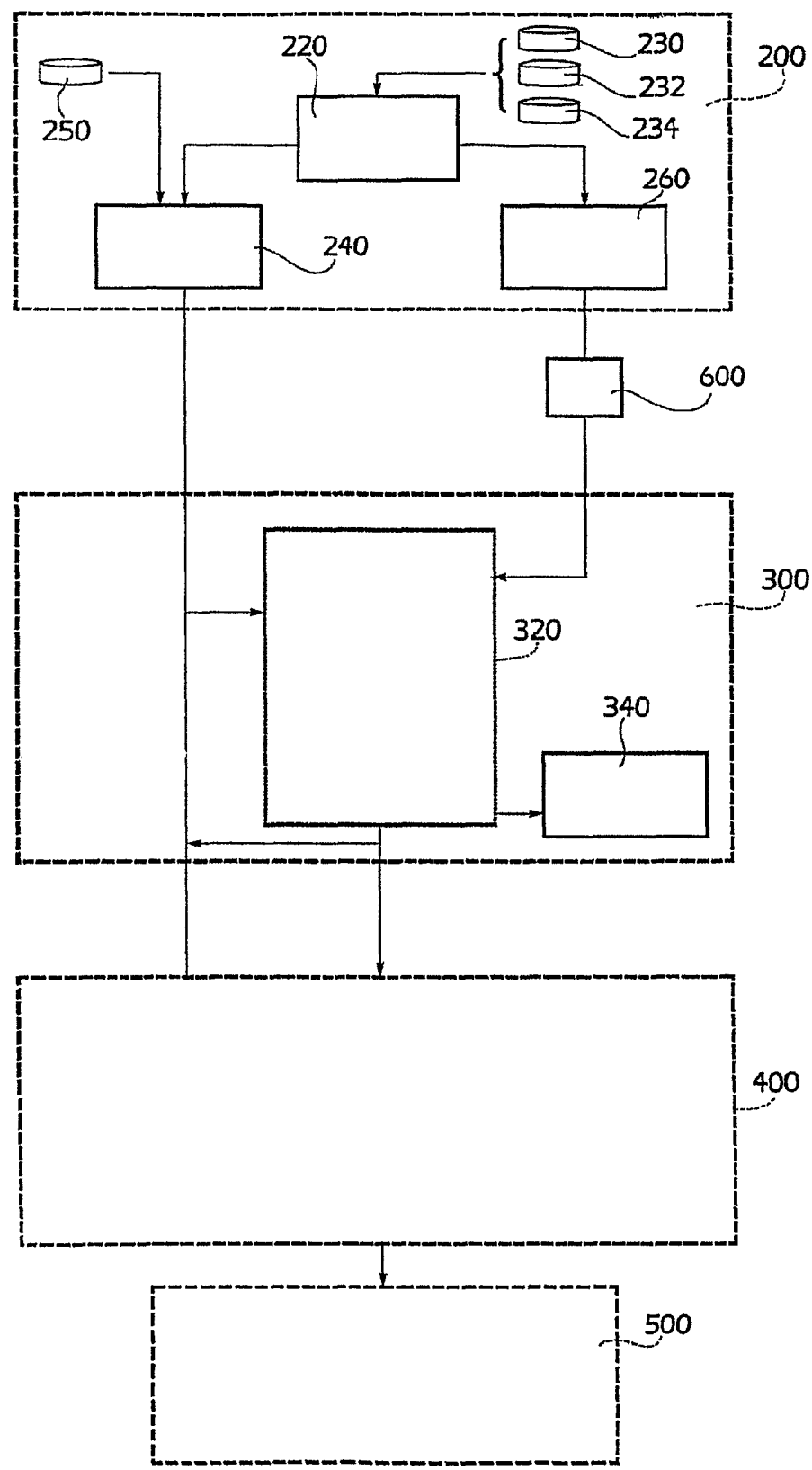
FIGS. 2a and 2b are flow diagrams of two variations of the method for planning a telecommunications network for radio equipment according to the invention.
Figure 2B:
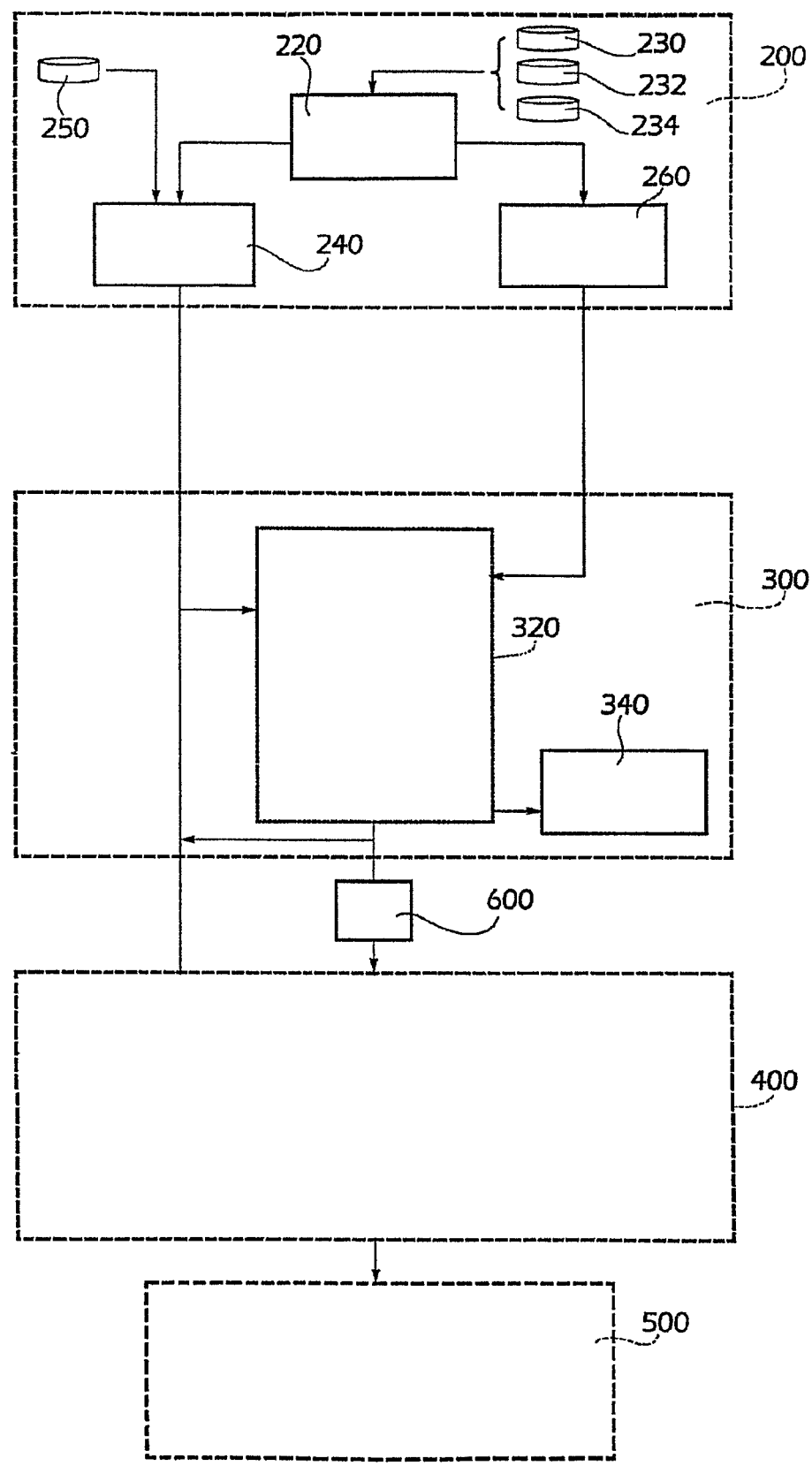

Merely as an example, the present invention will be applied to a deterministic method for planning a UMTS network synthetically recalled herein below with reference to FIGS. 2a and 2b and known from WO-A-02/35872, but obviously it can find application in any other network planning method of the CDMA, deterministic or statistic type.

The planning method comprises a plurality of steps that can be grouped into four logic blocks:

a first block 200 for preparing data necessary for network planning;

a second block 300 for planning and sizing the network depending on the radio connection from one mobile terminal to the Base Radio Station ("uplink" section);

a third block 400 for checking the sizing performed in block 300; and a fourth block 500 for refining the network planning and sizing depending on the radio connection from Base Radio Station to mobile terminals ("downlink" section)

The first block 200 comprises the operations of computing cell coverage areas (step 220), computing or forecasting traffic distribution on territory (step 240) and computing cell domains (step 260).

Sizes and characteristics of each coverage, namely of the locus of elementary territory areas or pixels in which the radio-electric signal radiated by a fixed radio station is received within a predetermined range (for example 80 Km) are computed depending on geographic data bases 230, urbanization and territory morphology data bases 232, and radio-electric characteristics of Radio Base Stations 234.

Processing by the system is automatic and the system is adapted to graphically show the computation results on the display 14 of workstation 10.

The traffic offered for every service per elementary area (pixel) is estimated according to different possible approaches depending on a traffic data base 250, for example by exploiting pre-existing reference information such as voice traffic measures of the GSM type, or estimating the traffic values pixel by pixel depending on information provided by marketing offices.

The step of computing domains provides for the computation, within each coverage area, using realistic propagation models related to the affected area, of the locus of pixels in which the radio-electric signal can be decoded by a mobile terminal when only the thermal noise is present.

The Domains computation is specific for UMTS networks and for the downlink section, and is performed taking as reference the family of services that shows looser limits, namely that service or that family of services that requires the lowest value of power received from a mobile terminal in order to be able to decode the radio-electric signal. In particular, the domain for each cell is computed by verifying for every coverage pixel whether the radio-electric signal is received with a greater power than the threshold determined depending on the loosest service.

Domains are not mutually exclusive and there will be intersection regions containing pixels belonging to more than one domain.

Processing by the system is automatic and the system is adapted to graphically show the computation results on the display 14 of workstation 10.

Block 300 comprises the operations of computing service areas (step 320) and computing macro-diversity areas (step 340).

When planning and sizing the network, the step of computing service areas, by exploiting traffic information, and domain-related information, allows sizing the "service area" for every cell, namely the set of pixels in which it is really possible to provide the Service of the possible set of UMTS services grouped onto a single radio carrier (family of Services).

Service areas are exclusive, namely each pixel belongs to a single service area, and they cannot be wider than their respective domain.

The computation for locating the service areas is performed in two steps: a first step of effectively computing the areas and a second step of checking for verifying the out-of-order areas (outage) due to the limited mobile power or verifying the Radio Base Station power.

Processing by the system is automatic and the system is adapted to graphically show the computation results on the display 14 of workstation 10.

The step of checking for verifying the out-of-order areas (outage) completes the computation of service areas, verifying pixel by pixel and for each service or family of services that the operating conditions imposed in the simulation related to mobile terminals are guaranteed, taking into account the real terminal power class.

If the condition is guaranteed (namely all pixels in computed service areas have a compatible power with the class of considered mobile terminals) the method goes on computing the macro-diversity areas in step 340, otherwise it goes back re-computing new service areas.

Finally, in step 340, the locus of pixels is located in which a mobile terminal is able to decode the signal coming from many Base Radio Stations. Computing of macro-diversity areas is performed by analyzing, for each computed service area, pixels outside such area, but inside the corresponding domain and verifying whether such pixels can be served according to a macro-diversity mechanism by Radio Base Stations of adjacent cells.

Also in this case the system is arranged for graphically displaying the obtained results on the display 14 of workstation 10.

Defining such areas is important both because the macro-diversity is relevant for the correct operation of CDMA systems (and it is therefore necessary to verify their existence), and because the extension of located areas affects the sizing of cell equipment: in fact, a mobile in macro-diversity engages resources on all the Base Radio Stations with which it is connected.

A final step (block 400) of refining the planning process, that correctly takes into account the intra-cell and inter-cell interference effects that in the previous steps have been estimated with a simplified methodology, allows compensating the approximations introduced in the previous steps and verifying the presence of possible unavailability areas to proceed with the detailed definition of plants to be installed.

Such step of verifying the performed sizing implies the check of areas that are under unavailability or out-of-order ("outage") conditions due to a reduced carrier/interference (C/I) ratio, and makes it possible to refine the sizes of computed service areas.

The system then goes on to block 500 for refining network planning and sizing depending on radio connection from Base Radio Station to mobile terminals ("downlink" section) depending on previously-obtained data.

The invention comprises the definition of an additional computing step 600 adapted to provide a pilot pollution estimation related to the expected traffic in the territory area being planned.

Such computing step can be inserted, for example, downstream of the cell domains evaluation (step 260) or upstream of the service areas computation (step 320), for a following refining when defining such areas by comparison with a pre-established level of tolerated pilot pollution.

Figure 3:
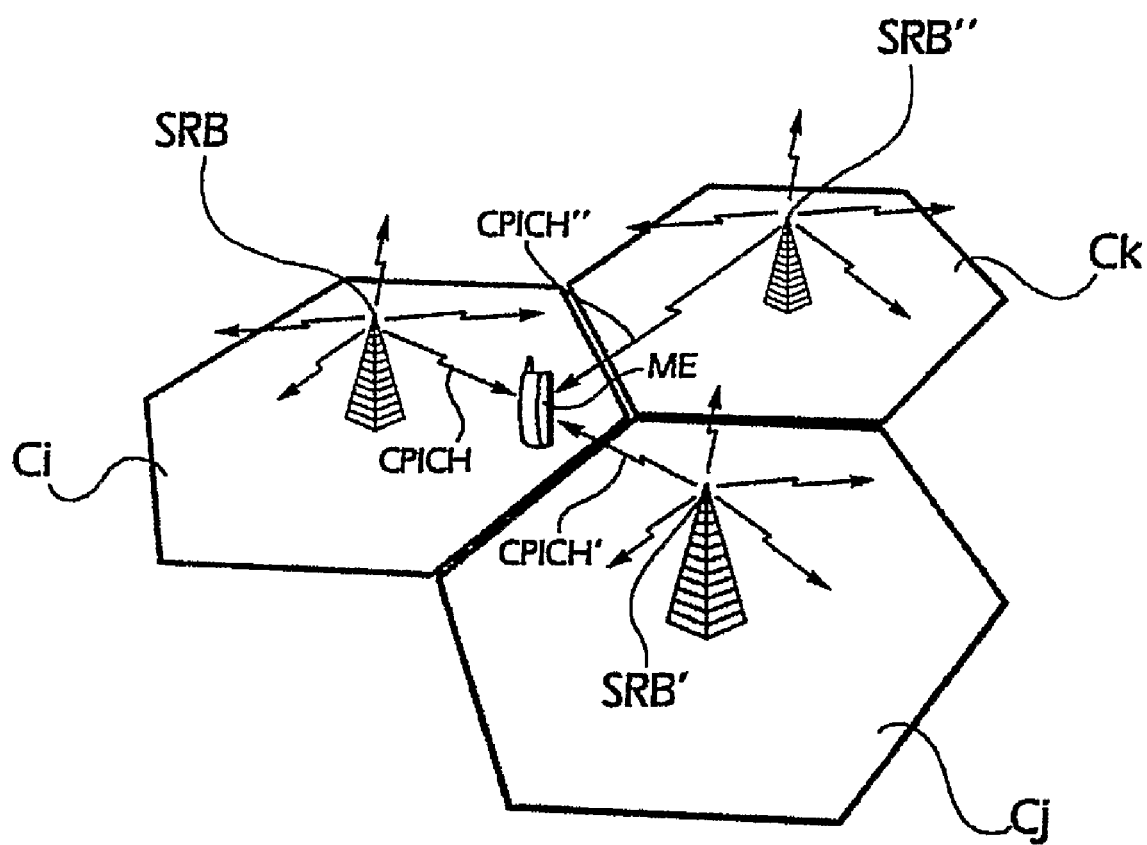
FIG. 3 is a schematic representation of three network cells affected by the pilot pollution phenomenon.

FIG. 3 schematically shows three cells $C_i$, $C_j$, $C_k$ of a UTMS network, each one of which comprises a set of elementary territory areas (pixels) adapted to receive a radio signal radiated by respective fixed Base Radio Stations, respectively designated by SRB, SRB', SRB".

Every Radio Base Station diffuses control channels at a common frequency, among which the common pilot channel CPICH. A mobile equipment ME located in a generic pixel (m,n) of cell $C_i$ (server cell) is subjected to receive signals from common pilot channels designated as CPICH, CPICH', CPICH" and respectively broadcast by Radio Base Stations SRB, SRB', SRB".

When equipment ME can be found in an area in which it receives such pilot signals with comparable powers, if the number of received cells exceeds the maximum number of manageable cells, a pilot pollution phenomenon results. Such phenomenon is particularly critical in areas characterized by a high value of offered traffic, where a reduced-quality service would be offered for a high number of users.

In order to optimize the minimization of such phenomenon, it is important to know in which territory areas the probability of generating traffic is high. The innovative process for locating and quantifying interference contributions due to pilot pollution is applied to every pair of cells and is described below.

A squared matrix $IM_{poll}$ is defined whose sizes are $N_{cells} \times N_{cells}$, where $N_{cells}$ represents the number of cells in the area under planning, in which the generic element $IM_{poll}[i,j]$ is computed, for every pair of cells (i,j) according to the formula:

$$IM_{poll}[i,j] = \begin{cases} \dfrac{\sum\limits_{s \in SERV_i} \sum\limits_{(m,n) \in \Omega_i} \dfrac{RSCP^j_{(m,n)}}{RSCP^i_{(m,n)}} \cdot T^s_{(m,n)} \cdot R_s}{Npix_i \cdot \sum\limits_{s \in SERV_i} T^i_s \cdot R_s} & \text{if } i \neq j \\ 0 & \text{if } i = j \end{cases}$$

where:
- $\Omega_i$ is the set of pixel composing the i-th cell area, for example the i-th cell service area or its Best Server CPICH area in which the pilot channel signal has a higher power value than any other pilot signal;
- $Npix_i$ is the size, in pixels, of set $\Omega_i$;
- (m,n) is the generic pixel belonging to the territory area being planned;
- $SERV_i$ is the set of services managed by the i-th cell;
- $T^S_{(m,n)}$ is the traffic offered in pixel m,n on service S;
- $R_S$ is the maximum Downlink transmission speed (Bit Rate) of service S;
- $T^i_S$ is the total traffic of service S, being present on the area represented by $\Omega_i$; and
- $RSCP^k_{(m,n)}$ is the power of the received signal of pilot channel CPICH (Received Signal Code Power) in the k-th cell by pixel (m,n) in area $\Omega_i$, equivalent to the power level of k-th cell in pixel (m,n) as computed in the step of computing electromagnetic coverages.

The generic matrix term $IM_{poll}[i,j]$ represents the average, extended to set $\Omega_i$, of the ratio between interfering signal and useful signal related to channels CPICH of cells i and j, weighed by the traffic offered in area $\Omega_i$ on possible services. Matrix elements are, by definition, numbers included between 0 and 1.

The term $IM_{poll}[i,j]$ thereby represents a sensitivity index of traffic contained in $\Omega_i$ to the contribution of interference from pilot pollution provided by cell j. High values (next to 1) correspond to a higher importance of interference contribution of cell j to traffic in area $\Omega_i$.

Such innovative approach can be used in general also in other deterministic method proposed by the known art or in statistic Montecarlo methods, for example downstream of the power check in the downlink section.

In a Montecarlo planning context, matrix $IM_{poll}$ is computed according to the same formula, where the traffic terms $T^i_S$ and $T^S_{(m,n)}$ are considered as final statistic aggregations of users distribution in area $\Omega_i$, obtained after the total of snapshots provided by the simulation. In practice, $T^i_S$ represents the total number of connections for the s-th service being present in area $\Omega_i$, while $T^S_{(m,n)}$ represents the total number of active connections in pixel (m,n) for the s-th service (served users).

The generic element [i,j] of matrix $IM_{poll}$, being computed in the context of a planning method either of the deterministic or of the statistic type, is therefore used as electromagnetic adjacence index between cells i and j, namely as interference index in the relationship between said cells, to establish a priority ordering according to decreasing values of the pairs of cells affected by pilot pollution upon which to act by assigning network resources in order to minimize the negative effects of pilot pollution on traffic.

Among the countermeasures that can be adopted to limit the pilot pollution between pairs of cells, the modification of one or more radio-electric parameters of at least one of the cells is for example provided, such as the antenna radiation diagram, the power emitted by the antenna, its orienting in space.

As can be deduced by the shown subjects, one of the peculiarities of the present invention consists in being able to enter inside an already known planning process, as addition of one step to the logic flow of operations, without implying the need of modifying elements upstream or downstream of it.

Obviously, leaving the invention principle unaffected, the embodiments and the particularities can be widely changed with respect to what has been described and shown merely as a non-limiting example, without departing from the scope of the present invention as defined by the enclosed Claims.

The invention claimed is:

1. A method for planning a telecommunications network for radio equipment including a plurality of cells arranged on a geographic area, wherein each one of the cells comprises a set of pixels adapted to receive radio signals radiated by a respective radio base station and wherein radio equipment located in a cell is subjected to receive common pilot channel signals broadcast by a plurality of radio base stations, comprising, for at least one of said cells:

determining an interference level provided by nearby cells to the traffic offered to the pixels of said cell related to the power difference between pilot channels broadcast by the radio base station of said cell and pilot channels broadcast by the respective radio base stations of nearby cells; and determining an area comprising the pixels of the cell in which the network is able to provide predetermined services to the radio equipment located therein, depending on said determined interference level and by comparison with a predetermined level of tolerated interference, said interference level provided by the nearby cells to the traffic offered to the pixels of said cell being estimated by using at least a coefficient depending on the amount of expected traffic in the pixels of said cell.

2. The method according to claim 1, wherein the estimation of the interference level is computed for every pair of cells by determining the average extended to said cell of the ratio between interfering signal and useful signal related to the pilot channels broadcast by the respective radio base stations of said pair of cells weighed with the offered traffic or the number of active users in said cell on various services.

3. The method according to claim 2, wherein, depending on the estimation of the interference level computed for every pair of cells, a priority ordering is established according to decreasing values of the pairs of cells affected by interference, thereby determining a network resources assignment order to minimize said interference.

4. The method according to claim 3, wherein, one or more radio-electric parameters are modified for at least one of the cells of each pair of cells affected by interference to minimize the negative effects of interference on the traffic, the modification of said parameters being determined depending on said priority ordering.

5. The method according to claim 2, wherein the useful signal power and the interfering signal power of pilot channels are computed depending on the electromagnetic coverage areas of the cells.

6. The method according to claim 2, wherein the interference level estimation is computed according to the formula:

$$IM_{poll}[i,j] = \begin{cases} \dfrac{\sum\limits_{s \in SERV_i} \sum\limits_{(m,n) \in \Omega_i} \dfrac{RSCP^j_{(m,n)}}{RSCP^i_{(m,n)}} \cdot T^s_{(m,n)} \cdot R_s}{Npix_i \cdot \sum\limits_{s \in SERV_i} T^j_s \cdot R_s} & \text{if } i \neq j \\ 0 & \text{if } i = j \end{cases}$$

so that said estimation assumes a real value of 0 to 1, values next to 1 corresponding to a higher importance of the interference contribution of cell j to the traffic in i area cell.

7. The method according to claim 1, wherein said common pilot channels are the pilot channels of the base radio station.

8. The method according to claim 7, wherein the estimation of the interference level between pilot channels of nearby cells is performed on a territory area comprising the pixels composing the domain of the server cell.

9. The method according to claim 7, wherein the estimation of the interference level between pilot channels of nearby cells is performed on a territory area comprising the pixels composing the service area of the server cell.

10. The method according to claim 9, wherein the estimation of the interference level between pilot channels of nearby cells is performed in the service area of the server cell after having determined the areas under unavailability or out-of-order ("outage") conditions.

11. The method according to claim 1, wherein the traffic offered in the cell on various services is estimated depending on pre-existing reference or forecast information.

12. A radio network planned using the method according to claim 1.

13. A processing system for planning a telecommunications network for radio equipment, programmed to perform a method according to claim 1.

14. A computer readable medium encoded with a computer program product or group of computer program products that can be executed by a processing system, comprising one or more code modules capable of performing the method according to claim 1.

15. A method for limiting interference due to common pilot channel broadcast by a plurality of radio base stations in a telecommunications network for radio equipment including a plurality of cells distributed on a geographic area, wherein each one of the cells comprises a set of pixels adapted to receive radio signals radiated by a respective radio base station and wherein radio equipment located in a cell is subjected to receive pilot channel signals broadcast from said plurality of radio base stations comprising, for each cell:

determining an interference level provided by nearby cells to the traffic offered to the pixels of the cell related to the power difference between pilot channels broadcast by the base station of the cell and pilot channels broadcast by base stations of nearby cells; and determining an area comprising the pixels of the cell in which the network is able to provide predetermined services to the radio equipment located therein, depending on said determined interference level and by comparison with a predetermined level of tolerated interference, said interference level provided by the nearby cells to the traffic offered to the pixels of the cell being estimated by using a coefficient depending on the amount of expected traffic in the pixels of said cell.

* * * * *